US010142841B2

United States Patent
Arana (10) Patent No.: US 10,142,841 B2
(45) Date of Patent: Nov. 27, 2018

(54) CONFIGURATION FOR MULTI-FACTOR EVENT AUTHORIZATION

(71) Applicant: Disney Enterprises, Inc., Burbank, CA (US)

(72) Inventor: Mark Arana, West Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 182 days.

(21) Appl. No.: 15/207,336

(22) Filed: Jul. 11, 2016

(65) Prior Publication Data

US 2018/0014197 A1    Jan. 11, 2018

(51) Int. Cl.
| | |
|---|---|
| *H04W 12/08* | (2009.01) |
| *H04L 29/06* | (2006.01) |
| *G06F 21/10* | (2013.01) |
| *G06F 21/34* | (2013.01) |

(52) U.S. Cl.
CPC ............ *H04W 12/08* (2013.01); *G06F 21/10* (2013.01); *G06F 21/34* (2013.01); *H04L 63/083* (2013.01); *H04L 63/0861* (2013.01); *H04L 63/0876* (2013.01); *H04L 63/107* (2013.01); *G06F 2221/2103* (2013.01); *H04L 2463/082* (2013.01); *H04L 2463/103* (2013.01)

(58) Field of Classification Search
USPC ............ 726/4, 2, 21, 36; 713/150, 163, 181; 380/255, 264, 276
See application file for complete search history.

(56) References Cited

U.S. PATENT DOCUMENTS

| | | | | |
|---|---|---|---|---|
| 8,789,086 | B2 * | 7/2014 | McCoy | ............ H04N 21/25875 |
| | | | | 725/109 |
| 8,843,752 | B1 * | 9/2014 | Priyadarshi | ............. G06F 21/44 |
| | | | | 713/168 |
| 9,178,962 | B2 | 11/2015 | Le Nerriec et al. | |
| 9,179,199 | B2 * | 11/2015 | Alsina | ................ H04N 21/6587 |
| 9,251,334 | B1 * | 2/2016 | Molitor | ................... G06F 21/10 |
| 2007/0022301 | A1 * | 1/2007 | Nicholson | .............. G06Q 20/02 |
| | | | | 713/184 |

(Continued)

OTHER PUBLICATIONS

"If iTunes repeatedly prompts you to authorize your computer," Apple Support, https://support.apple.com/en-gb/HT203160, May 13, 2016.

*Primary Examiner* — Sharif E Ullah
(74) *Attorney, Agent, or Firm* — Patent Ingenuity, P.C.; Samuel K. Simpson (57) ABSTRACT

An authorization device receives a message from a content server through a network based upon a first factor of authorization being completed by a playback device requesting playback of content associated with a user account. The authorization device may be a mobile device that is associated with the user. The authorization device may receive a user input indicating an approval of the requested playback. The authorization device may send a playback authorization message through the network to the content server. The content server may use at least a first factor of authorization such a login credential from a smart playback device or a registration credential from another type of playback device in addition to a second factor of authorization such as the playback authorization message to generate a user authentication that is provided to allow the playback device to playback the content.

12 Claims, 6 Drawing Sheets

(56) References Cited

U.S. PATENT DOCUMENTS

| | | | |
|---|---|---|---|
| 2013/0298215 A1* | 11/2013 | Kuznetsov | H04L 9/3263 |
| | | | 726/8 |
| 2014/0189067 A1 | 7/2014 | Gratton et al. | |
| 2014/0189808 A1 | 7/2014 | Mahaffey et al. | |
| 2015/0058936 A1* | 2/2015 | Kang | H04L 63/08 |
| | | | 726/4 |
| 2015/0089635 A1 | 3/2015 | Alpert et al. | |
| 2015/0242597 A1 | 8/2015 | Danciu | |
| 2015/0381614 A1 | 12/2015 | Hildreth et al. | |
| 2016/0066004 A1* | 3/2016 | Lieu | H04N 21/2541 |
| | | | 725/29 |

* cited by examiner

CONFIGURATION FOR MULTI-FACTOR EVENT AUTHORIZATION

BACKGROUND

1. Field

This disclosure generally relates to the field of data content. More particularly, the disclosure relates to a secure environment for playback of and/or access to the data content.

2. General Background

Unauthorized disclosure or "leaks" of data intended to be kept confidential continue to occur amongst a variety of contexts where keeping data secure is paramount. For instance, a movie studio screener is an advance screening of studio content that is sent to various media industry professionals in a confidential manner prior to the public release of such content. The screener allows the recipient to suggest edits, perform reviews, etc. As the screener may be sent to the intended recipient in a digital format via a digital screener, leaks may occur when access credentials to the screener are shared by the intended recipient with an unintended recipient.

SUMMARY

In one aspect, an authorization device receives a message from a content server through a network based upon a first factor of authorization being completed by a playback device requesting playback of content associated with a user account. The authorization device may be a mobile device that is associated with the user and that is distinct from the playback device.

Further, the authorization device may receive a user input indicating an acknowledgement and approval of the requested playback. Based on the approval, the authorization device may send a playback authorization message through the network to the content server.

The content server may use at least a first factor of authorization such as a login credential from a smart playback device or a registration credential from another type of playback device in addition to a second factor of authorization such as the playback authorization message to generate a user authentication that is provided to allow the playback device to playback the content.

BRIEF DESCRIPTION OF THE DRAWINGS

The above-mentioned features of the present disclosure will become more apparent with reference to the following description taken in conjunction with the accompanying drawings, wherein like reference numerals denote like elements and in which.

DETAILED DESCRIPTION

A configuration for multi-factor authorization, i.e., multiple and distinct forms of authorization and/or conditions for authorization that provide a heightened level of security and accountability, is provided to provide a secure environment for content intended to be played back and/or otherwise accessed by a particular recipient. For instance, a user may have an account associated with a digital screener system and may register multiple devices for playback to that account via a software application. The configuration allows the user to use a mobile device registered to the account to authorize playback and/or other forms of access to content on a distinct device registered to the account. As a mobile device is typically not shared with another user, the configuration helps minimize sharing of login credentials to the digital screener system. As a result, the configuration ensures that the recipient of a digital screener or other secure content is the intended recipient.

Figure 1:
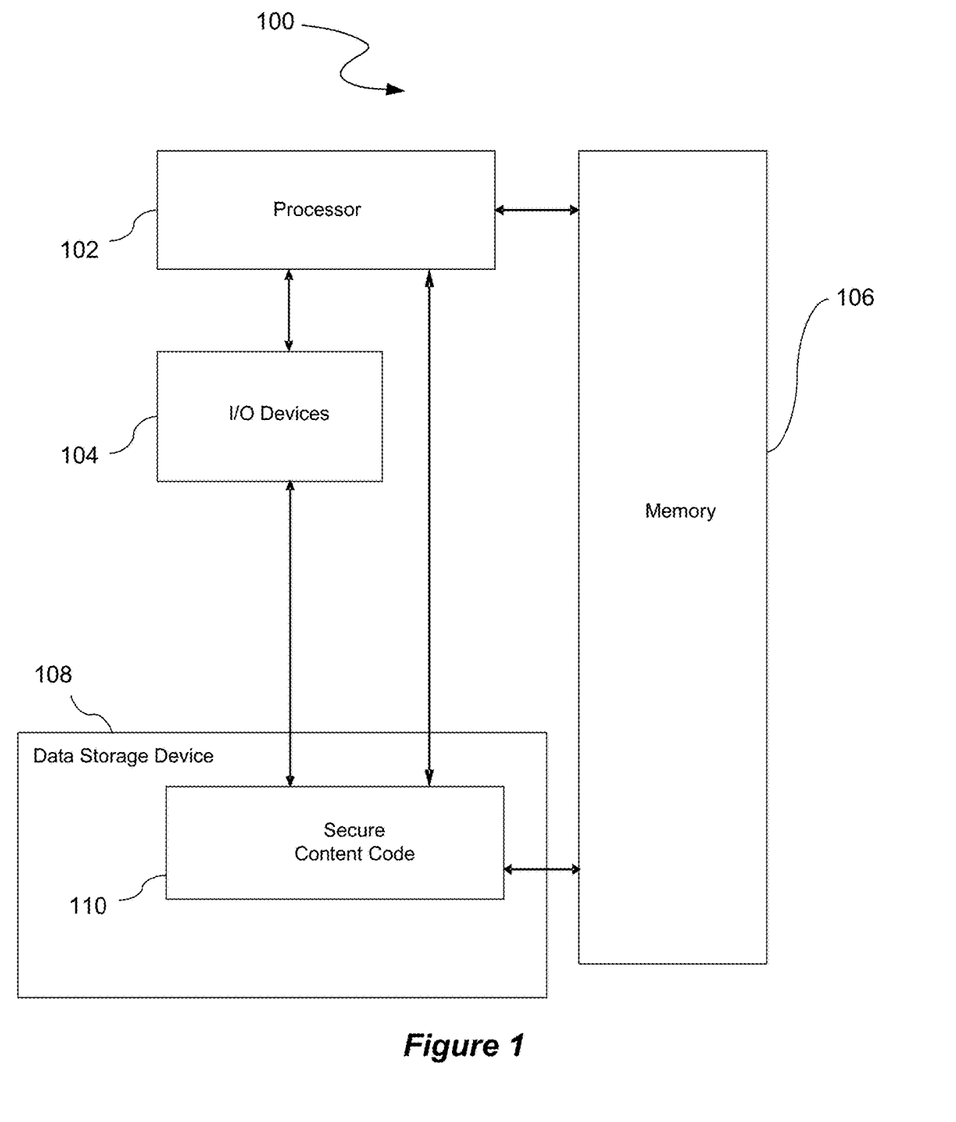
FIG. 1 illustrates an authorization device that is used to authorize playback and/or other forms of access to content via a distinct device that is registered to the same account as the authorization device.

FIG. 1 illustrates an authorization device 100 that is used to authorize playback and/or other forms of access to content via a distinct device that is registered to the same user account as the authorization device 100. In one aspect, the authorization device 100 is a mobile device that is associated with a particular user. For example, the mobile device may be a smartphone, a tablet device, a smart watch, smart glasses, smart wearable device, or other type of device that moves with the user to various locations.

As illustrated, the authorization device 100 comprises a processor 102, a memory 106, e.g., random access memory ("RAM") and/or read only memory ("ROM"), a data storage device 108 that stores secure content code 110, and various input/output ("I/O") devices 104. The I/O devices 104 may include audio/video inputs, audio/video outputs, display devices, projectors, receivers, transmitters, audio speakers, image capture sensors, user input devices, microphones, etc. In one aspect, the I/O devices 104 are integrated within the authorization device 100. In another aspect, the I/O devices 104 are not integrated within the authorization device 100, but are in operable communication with the authorization device 100.

In one aspect, the data storage device 108 loads the secure content code 110 from a computer readable storage device, e.g., a magnetic or optical drive, diskette, or non-volatile memory, DVD, CD-ROM, etc. The secure content code 110 is then operated by the processor 102 in the memory 106 of the authorization device 100. In another aspect, the data storage device 108 is the computer readable storage device. In yet another aspect, the secure content code 110 is stored in the memory 106 rather than the data storage device 108. As such, the secure content code 110 and associated data structures of the present disclosure may be stored on a computer readable storage device.

The secure content code 110 allows the authorization device 100 to perform various tasks corresponding to multi-factor authorization. For example, the authorization device 100 may use the secure content code 110 as a software application to display information, receive inputs, communicate with other devices, etc. to perform multi-factor authorization.

Figure 2:
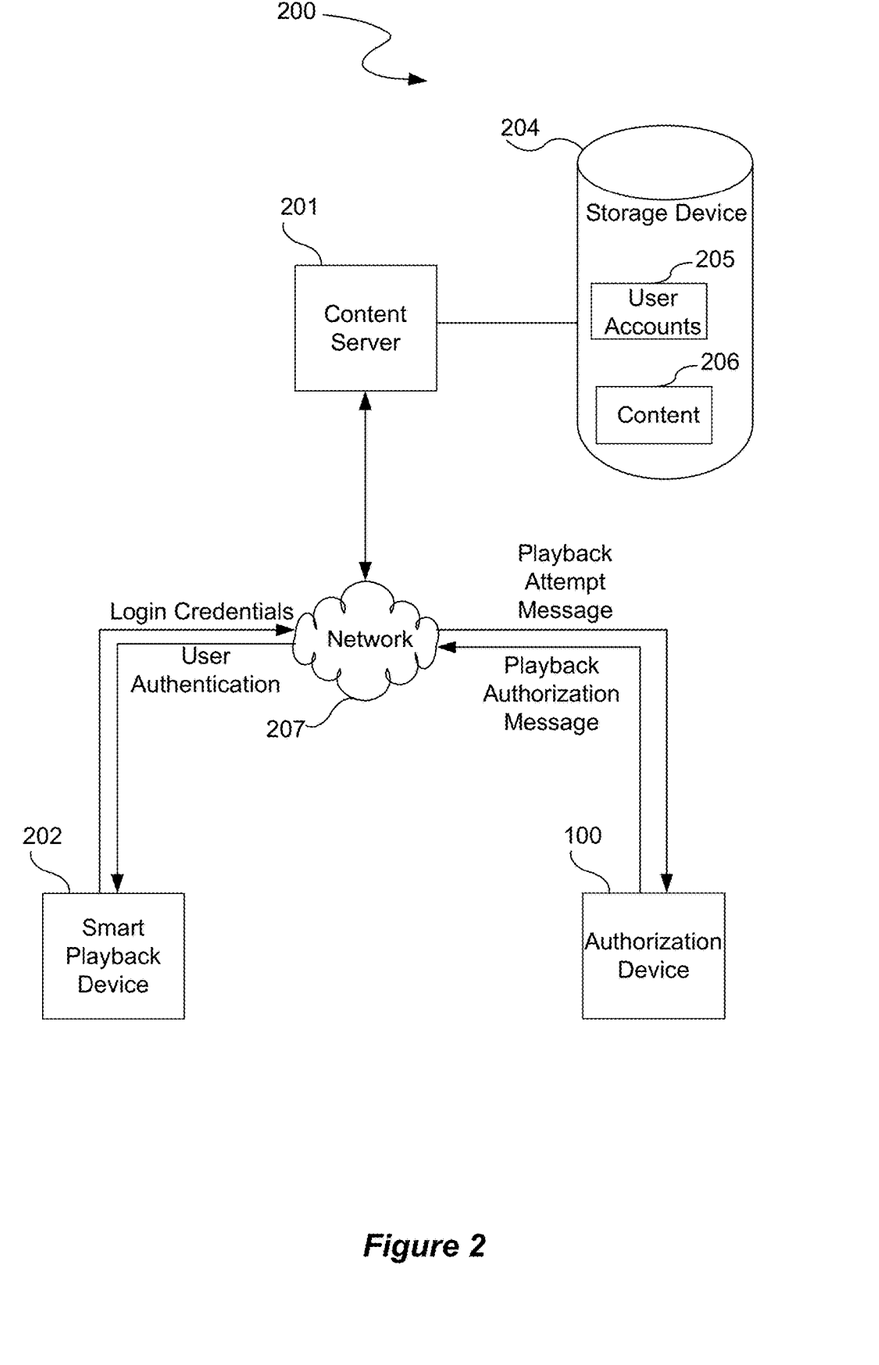
FIG. 2 illustrates a multi-factor authorization system that provides multi-factor authorization for devices that are registered to the same user account.

FIG. 2 illustrates a multi-factor authorization system 200 that provides multi-factor authorization for devices that are registered to the same user account. The multi-factor authorization system 200 has a content server 201 that is in operable communication with a storage device 204, e.g., database. The storage device 204 stores various data such as data pertaining to user accounts 205 and content 206, e.g., digital screeners, movies, etc. Alternatively, multiple storage devices 204 may be used to store the data pertaining to the user accounts 205 and the content 206.

In one aspect, multiple devices are registered to the same service, e.g., the digital screening service provided by the content server 201, with the same user account 205. For example, the authorization device 100 illustrated in FIG. 1 and a smart playback device 202, i.e., a playback device that has processing capability for providing login credentials to the content server 201, may be registered to the same user account 205. The smart playback device 202 may be a stationary playback device, e.g., a smart television, a desktop computer, etc., or a mobile playback device, e.g., a smartphone, a tablet device, a smart wearable device, etc. By being registered, each device 100 and 202 has the capability to provide login credentials, e.g., username and password or biometric such as a fingerprint, to the content server 201 to communicate with and/or otherwise access the content server 201. In other words, devices 100 and 202 are trusted devices. Further, devices 100 and 202 communicate with the content server 201 via a computerized network 207.

If a user operating the smart playback device 202 wants to view particular content 206, the user uses the smart playback device 202 to send an authentication request with login credentials to the content server 201 to authenticate that user via the login credentials. The content server 201 then verifies that the login credentials provided by the smart playback device 202 are the login credentials associated with the user account 205. By performing such verification, the content server 201 has completed the first factor of the multi-factor authorization.

After authenticating the login credentials of the smart playback device 202 and/or associated user, the content server 201 sends a message to the authorization device 100 to inform the authorization device 100 of the attempt to perform playback. The user associated with the authorization device 100 may then provide an approval input so that the authorization device 100 is activated to send a playback authorization message to the content server 201. By providing such approval input, the authorization device 100 has completed the second factor of the multi-factor authorization. As a result, each phase of the multi-authorization is performed by a trusted device.

The playback authorization message may include various restrictions. For example, the playback authorization message may only authorize a certain quantity of playbacks, a certain time period for performing a playback, etc. In one aspect, a menu may be provided on the authorization device 100 so that the user associated with the authorization device 100 may select from a plurality of predetermined playback restrictions. In another aspect, the user may customize the playback authorization message.

Based on the completion of the first and second factors of the multi-factor authorization, the content 201 sends a user authentication to the smart playback device 202 so that the smart playback device 202 is able to playback and/or otherwise access content 206 stored by the storage device 204. As a result, the multi-factor authorization system 200 provides a heightened level of security for content 206 to ensure that only intended recipients of content 206 are able to playback and/or otherwise access the content 206.

The multi-factor authorization system 200 solves the technology-based problem of digital content, e.g., the content 206, being accessed and/or leaked by unintended recipients. The problem is network-centric as the login credentials are provided via the computerized network 207 between the smart playback device 202 and the content server 201. Further, the solution provided by the multi-factor authorization system 200 is necessarily rooted in technology as a user communicating with the content server 201 has to have a technology-based device, e.g., the authorization device 100, to communicate remotely via the network 207 with the content server 201. In addition, the solution is necessarily rooted in technology as use of the authorization device 100, which is distinct from the device that performs playback, is used to control authorization of playback as an additional factor for authorization to prevent access and/or leaks to the content 206 that may result from only relying on the login credentials provided by the smart playback device 202. In other words, the solution uses a technology-based authorization device 100 that is distinct from the technology-based smart playback device 202 to prevent unintended leaks and/or access to the content 206 through the technology-based network 207.

Figure 3:
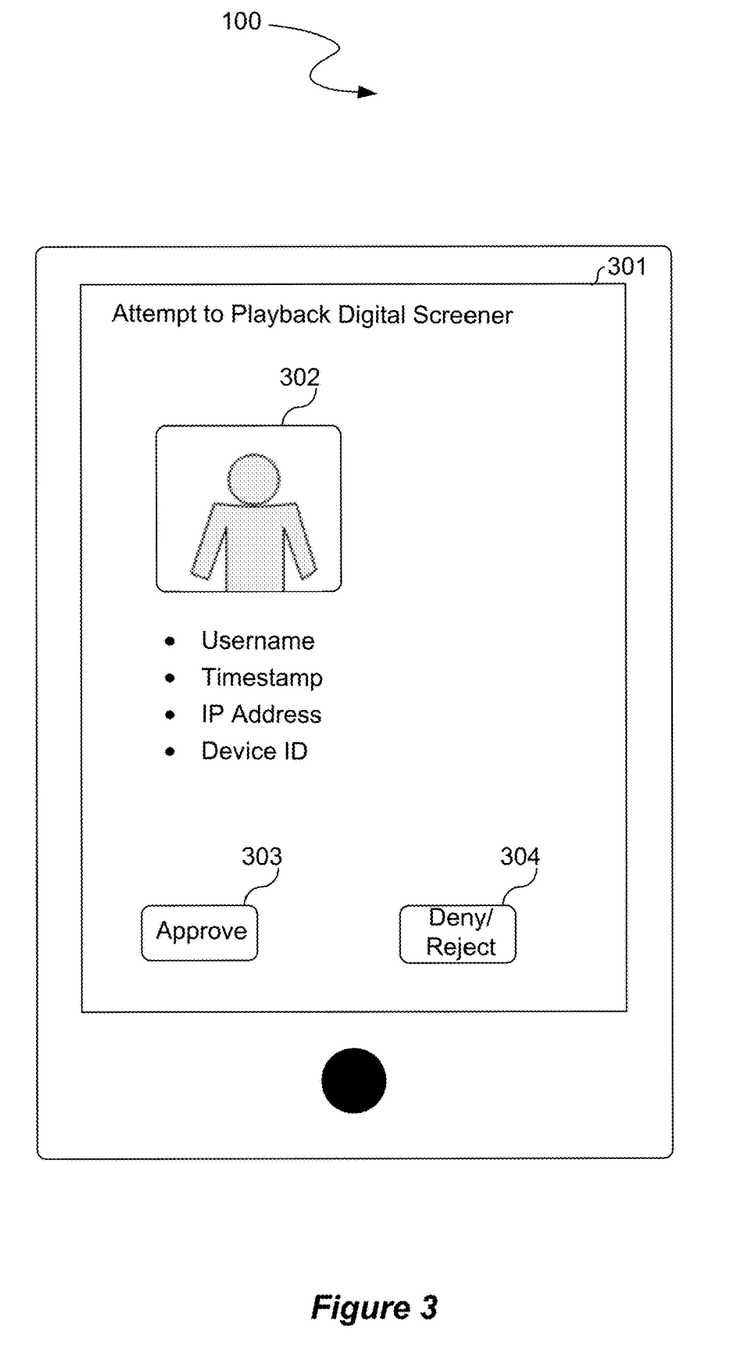
FIG. 3 illustrates an example of the playback message displayed by the authorization device.

Various types of information may be provided in the playback attempt message from the content server 201 to the authorization device 100 illustrated in FIG. 1. FIG. 3 illustrates an example of the playback message displayed by the authorization device 100. The authorization device 100 may have a display component 301, e.g., display screen, that displays various information such as a picture 302 of the user sending the playback request from the smart playback device 202. For instance, the smart playback device 202 may have image capture capability (to capture an image of the user making a request) and/or be in operable communication with a device that has image capture capability. Other information, e.g., username, time/date stamp, IP address, device ID, geolocation, etc., may additionally or alternatively be sent to help the user associated with the authorization device 100 determine whether or not to approve the smart playback device 202 for playback of the digital screener.

The display component 301 may display an approval indicium 303, e.g., a button that the user associated with the authorization device 100 may select to indicate authorization of the smart playback device 202 for playback of the content 206. Further, the display component 301 may display a deny/reject indicium 304, e.g., a button that the user associated with the authorization device 100 may select to deny/reject authorization of the smart playback device 202 for playback of the content 206. Other forms of approval such as voice command, hand gesture, SMS text message, etc., may be used instead.

After the user selects the approval indicium 303, the authorization device 100 may generate the playback authorization message illustrated in FIG. 2 to inform the content server 201 that the second factor of the multi-factor authorization has been completed. In one aspect, the authorization device 100 may automatically include additional information in the playback authorization message other than the approval. For example, the authorization device 100 may include a geolocation of where the approval took place, an image capture of the user that performed the approval, a biometric capture of the user that performed the approval, etc. In one aspect, such additional information may be used as a third factor of the multi-factor authorization after the content server 201 verifies the identification information of the approver via facial recognition, biometric authentication, etc. Such additional information also provides an additional level of accountability so that an approver is accountable for users that are authorized by the approver for playback of the content 206.

Further, the content server 201 may use the additional information for additional factors of multi-authorization. For example, the content server 201 may have a rule that restricts playback of the content 206 if the smart playback device 202 is outside of a predetermined range from the authorization device 100. The content server 201 may compare the geolocation coordinates obtained from the smart playback device 202 and the authorization device 100 to determine if the devices 202 and 100 are within the predetermined range. In one aspect, the smart playback device 202 automatically, without a user input, retrieves the geolocation coordinates of the smart playback device 202, e.g., via an integrated GPS component, and sends the geolocation coordinates with the login credentials. In another aspect, the authorization device 100 automatically, without a user input, retrieves the geolocation coordinates of the authorization device 100, e.g., via an integrated GPS component, and sends the geolocation coordinates with the playback authorization message upon approval received from the user associated with the authorization device 100.

In another aspect, the approval indicium 303 includes more than a selection input. For example, the approval indicium 303 may also include a user specific challenge that the user associated with the authorization device 100 has to respond to in order to send the authorization to the content server 201. For instance, the user may have to select an image from a plurality of preselected images as a response to the challenge.

The example illustrated in FIG. 2 has one authorization device 100 and one smart playback device 202 for example purposes only. Accordingly, one or more authorization devices 100 and/or one or more smart playback devices 202 may be used to perform multi-factor authorization.

Further, the example illustrated in FIG. 2 is not intended to be limited to any particular form of content 206. In other words, the multi-factor authorization system 200 may be used to provide secure authorization of playback for content 206 other than digital screeners. For example, the multi-factor authorization system 200 may be used to authorize playback of movies in the library of a user on a distinct device from where the library is stored. The multi-factor authorization system 200 may also be used to authorize playback of different versions of the content 206, e.g., a "G" rated version as opposed to a "PG" rated version of the content 206.

Figure 4A:
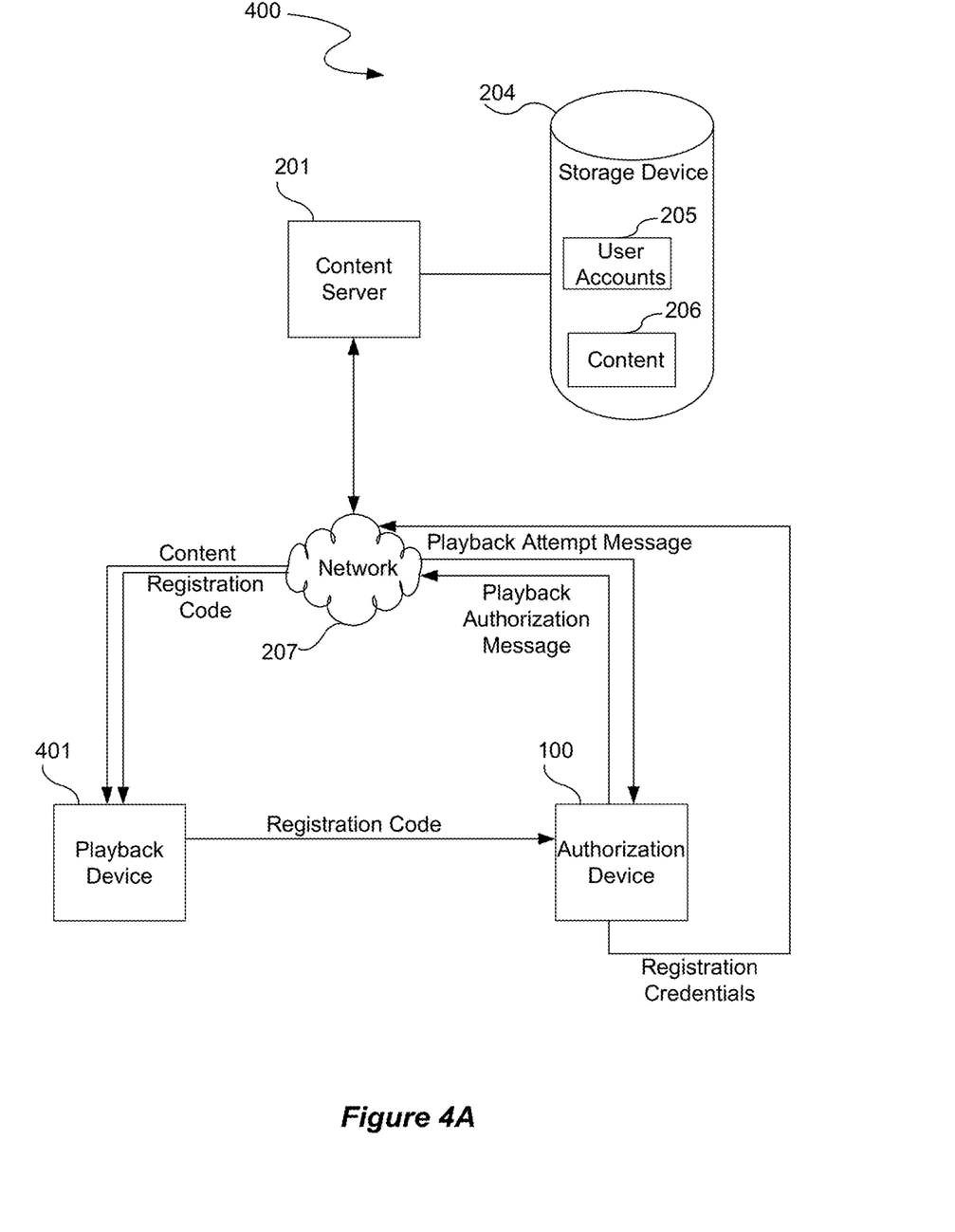
FIG. 4A illustrates a multi-factor authorization system that uses a playback device without smart device functionalities.

The multi-factor authorization system 200 illustrated a smart playback device 202, but multi-factor authorization may alternatively be performed with a playback device without such smart functionality. FIG. 4A illustrates a multi-factor authorization system 400 that uses a playback device 401 without smart device functionalities. For example, the playback device 401 may be connected to the network 207 to receive communications, but does not have the processing capabilities to register the playback device 401 with the content server 201. In other words, the playback device 401 has minimal processing capabilities. An example is a set top box with minimal processing capabilities that is connected to a television.

Since the playback device 401 is incapable of registering with the content server 201, the authorization device 100 provides registration credentials for the authorization device 100 and the playback device 401 to the content server 201. For instance, the playback device 401 may receive a registration code from the content server 201 upon an attempt to perform playback of the content 206. The authorization device 100 then obtains the registration code from the playback device 401, e.g., via NFC communication, scanning the registration code, user input of the registration code, etc. Further, the authorization device 100 subsequently sends the login credentials for the authorization device 100 and the registration code to register the playback device 401 to the content server 201. The authorization device 100 may then provide an approval to authorize the playback. The content server 201 may then either send the content 206 directly to the playback device 401 or send a user authentication to the authorization device 100 that may be inputted at the playback device 401 to obtain the content 206.

In one aspect, the registration code has a time restriction. For instance, the registration code has to be used within a predetermined time limit after being sent from the content server 201 to the playback device 401. If the registration code is not used within that predetermined time limit, the registration code expires and is not able to be used for playback of the content 206.

Figure 4B:
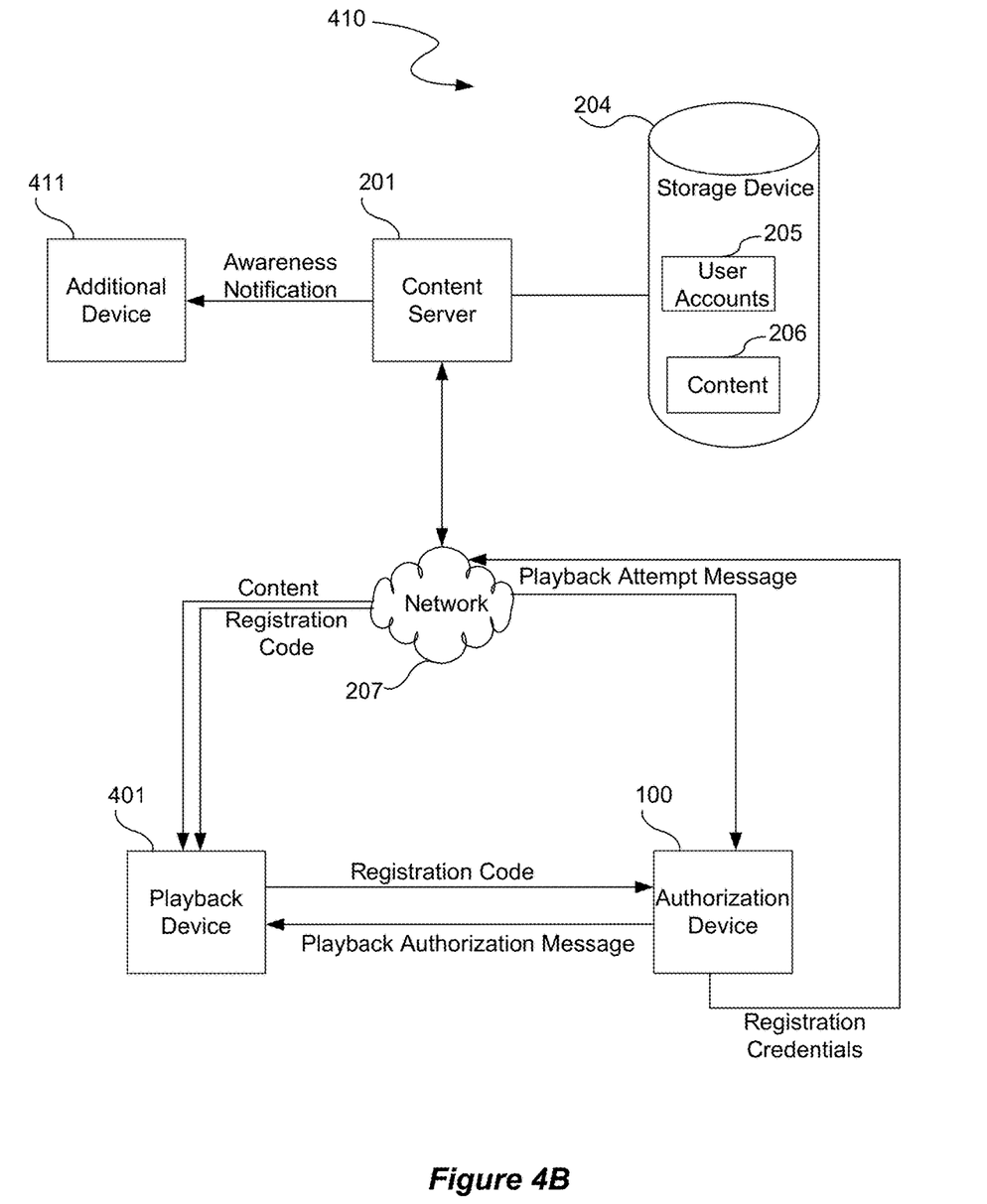
FIG. 4B illustrates an alternative multi-factor authorization system to the multi-factor authorization system illustrated in FIG. 4A.

FIG. 4B illustrates an alternative multi-factor authorization system 410 to the multi-factor authorization system 400 illustrated in FIG. 4A. The multi-factor authorization system 410 has an additional device 411 that receives an awareness notification that informs the playback device 401 of the authorization device 100. Further, the playback attempt message received by the authorization device 100 from the content server 201 may inform the authorization device 100 of the playback device 401. As a result, the content server 201 informs the authorization device 100 and the playback device 401 of each other. Therefore, the authorization device 100 may send the playback authorization message directly to the playback device 401 to authorize the playback device 401 to perform playback of the content 206.

Figure 5:
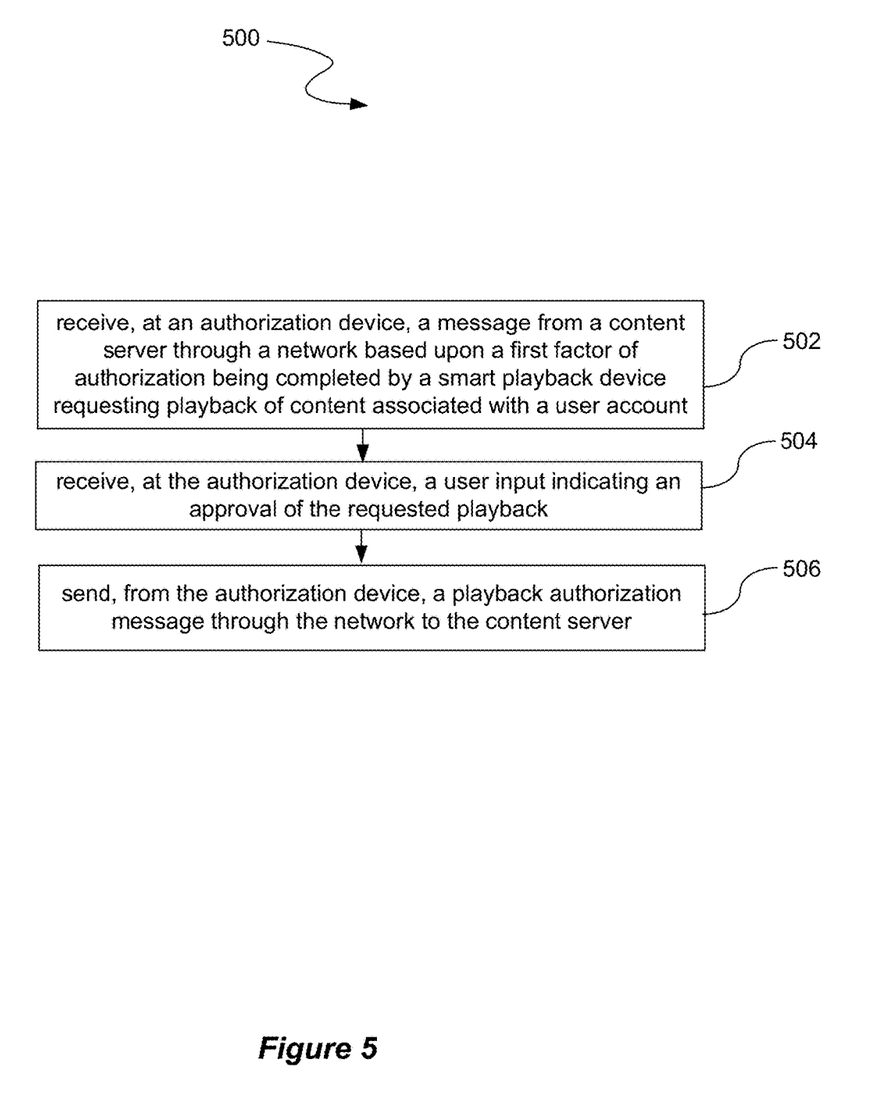
FIG. 5 illustrates a process that is used for the authorization device illustrated in FIG. 2 to perform multi-factor authorization.

Various processes may be used to provide multi-factor authorization. FIG. 5 illustrates a process 500 that is used for the authorization device 100 illustrated in FIG. 2 to perform multi-factor authorization. At a process block 502, the process 500 receives, at the authorization device 100, a message from the content server 201 through the network 207 based upon a first factor of authorization being completed by the smart playback device 202 requesting playback of content associated with a user account. Further, at a process block 504, the process 500 receives, at the authorization device 100, a user input indicating an approval of the requested playback. In addition, at a process block 506, the process 500 sends, from the authorization device 100, a playback authorization message through the network 207 to the content server 201.

The multi-factor authorization configurations provided for herein are not limited to playback. For example, multi-factor authorization may be used to provide a heightened level of security to access of data such as data files. An attempt by a user at a computing device to access a particular data file would result in an access attempt message being remotely sent to the distinct authorization device 100. The user would then only gain access to the data file if an approval was sent from the authorization device 100 to the content server 201.

The processes described herein may be implemented in a specialized, general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium, e.g., computer readable storage device, capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a desktop computer, laptop, smartphone, tablet device, set top box, etc.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

I claim:

1. A computer program product comprising a non-transitory computer readable storage device having a computer readable program stored thereon, wherein the computer readable program when executed on a computer causes the computer to:
receive, at an authorization device, a message from a content server through a network based upon a first factor of authorization being completed by a smart playback device requesting playback of content associated with a user account, the authorization device being a mobile device associated with a user corresponding to the user account, the authorization device being distinct from the smart playback device, the authorization device and the smart playback device being registered with the user account, the first factor of authorization comprising a login credential associated with the user account for the smart playback device, the login credential comprising a username;
receive, at the authorization device, a user input indicating an approval of the requested playback;
send, from the authorization device, a playback authorization message and a third factor of authorization through the network to the content server, the playback authorization message being based upon the approval, the playback authorization message being a second factor of authorization that is at least used by the content server in conjunction with the first factor of authorization and the third factor of authorization to generate a user authentication that is provided to the smart playback device to allow the smart playback device to playback the content, the third factor of authorization comprising a user input associated with a challenge.

2. The computer program product of claim 1, wherein the message comprises data associated with the smart playback device selected from the group consisting of: an IP address, a geolocation, and a device id.

3. The computer program product of claim 1, wherein the modality of the user input is selected from the group consisting of: a button selection, a speech command, photo submission, text input, and a hand gesture.

4. The computer program product of claim 1, wherein the third factor of authorization also comprises an identification factor selected from the group consisting of: an image of a user providing the user input, an IP address of the authorization device, biometric data associated with the user, and a watermark associated with the user.

5. The computer program product of claim 1, wherein the content is selected from the group consisting of a digital screener and a movie.

6. The computer program product of claim 1, wherein the authorization device is selected from the group consisting of: a smartphone, a tablet device, a smartTV, and a smart wearable device.

7. A computer program product comprising a non-transitory computer readable storage device having a computer readable program stored thereon, wherein the computer readable program when executed on a computer causes the computer to:
receive, at a content server, a request from a smart playback device through a network to playback content associated with a user account, the request including a first factor of authorization;
determine, at the content server, completion of the first factor of authorization, the first factor of authorization comprising a login credential associated with the user account for the smart playback device, the login credential comprising a username;
send, from the content server, to an authorization device through a network a message based upon the completion of the first factor of authorization, the authorization device being a mobile device associated with a user corresponding to the user account, the authorization device being distinct from the smart playback device, the authorization device and the smart playback device being registered with the user account; and
receive, at the content server, a playback authorization message and a third factor of authorization through the network from the authorization device, the playback authorization message being based upon an approval of the requested playback received at the authorization device, the playback authorization message being a second factor of authorization that is at least used by the content server in conjunction with the first factor of authorization and the third factor of authorization to generate a user authentication that is provided to the smart playback device to allow the smart playback device to playback the content, the third factor of authorization comprising a user input associated with a challenge.

8. The computer program product of claim 7, wherein the message comprises data associated with the smart playback device selected from the group consisting of: an IP address, a geolocation, and a device id.

9. The computer program product of claim 7, wherein the modality of the user input is selected from the group consisting of: a button selection, a speech command, and a hand gesture.

10. The computer program product of claim 1, wherein the third factor of authorization also comprises an identification factor selected from the group consisting of: an image of a user providing the user input, an IP address of the authorization device, biometric data associated with the user, and a watermark associated with the user.

11. The computer program product of claim 1, wherein the content is selected from the group consisting of a digital screener and a movie.

12. The computer program product of claim 1, wherein the authorization device is selected from the group consisting of: a smartphone, a tablet device, a smartTV, and a smart wearable device.

\* \* \* \* \*